US012679231B2

(12) United States Patent　　　　(10) Patent No.:　US 12,679,231 B2

Bode　　　　　　　　　　　　　　　　(45) Date of Patent:　　　Jul. 14, 2026

(54) METHOD, AUTHENTICATION MEANS AND AUTHORIZATION DEVICE FOR AUTHORIZING A CHARGING PROCESS

(71) Applicant: Siemens Aktiengesellschaft, Munich (DE)

(72) Inventor: Sebastian Bode, Ahlen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 937 days.

(21) Appl. No.: 17/920,078

(22) PCT Filed: Apr. 16, 2021

(86) PCT No.: PCT/EP2021/059894

§ 371 (c)(1),
(2) Date: Oct. 20, 2022

(87) PCT Pub. No.: WO2021/213913

PCT Pub. Date: Oct. 28, 2021

(65) Prior Publication Data

US 2023/0158901 A1　　　May 25, 2023

(30) Foreign Application Priority Data

Apr. 21, 2020　　(DE) ..................... 10 2020 205 022.8

(51) Int. Cl.
B60L 53/126 (2019.01)
G06F 21/60 (2013.01)
(Continued)

(52) U.S. Cl.
CPC .......... B60L 53/126 (2019.02); G06F 21/602 (2013.01); G06F 21/62 (2013.01); H02J 7/47 (2026.01)

(58) Field of Classification Search
CPC ....... B60L 53/126; G06F 21/602; G06F 21/62
(Continued)

(56) References Cited

U.S. PATENT DOCUMENTS

| | | | |
|---|---|---|---|
| 2011/0191265 A1 | 8/2011 | Lowethal | G06Q 50/00 |
| 2015/0071444 A1* | 3/2015 | Knubben | H02J 50/80 |
| | | | 380/270 |
| 2018/0186245 A1 | 7/2018 | Diaz | B60L 11/81 |

FOREIGN PATENT DOCUMENTS

| | | | | |
|---|---|---|---|---|
| DE | 10 2010 032 580 | 11/2011 | | H04L 9/32 |
| DE | 10 2012 011 773 | 12/2013 | | G08C 17/00 |

(Continued)

OTHER PUBLICATIONS

Search Report for International Application No. PCT/EP2021/059894, 14 pages, Dec. 21, 2020.
(Continued)

*Primary Examiner* — Richard V Muralidar

(74) *Attorney, Agent, or Firm* — Slayden Grubert Beard PLLC

(57)　　　　　　　ABSTRACT

Various embodiments of the teachings herein include a method for authorizing a charging process at a charging point. The method may include: establishing a near field interface between an authentication means and the charging point; transmitting a user identification signed using a signature key via the near field interface and authenticating by checking the signed user identification; reconciling a plurality of condition data sets retained in a memory area of the authentication means with a plurality of condition data sets retained in a memory area of the charging point, wherein an item of version information is assigned to one of the condition data sets and a first condition data set is replaced by a second condition data set by the reconciliation in consideration of a comparison of the respective version
(Continued)

information; and authorizing the charging process by evaluating one of the condition data sets.

10 Claims, 1 Drawing Sheet

(51) Int. Cl.
    *G06F 21/62*         (2013.01)
    *H02J 7/47*          (2026.01)

(58) Field of Classification Search
    USPC .................................................. 320/106, 109
    See application file for complete search history.

(56) References Cited

FOREIGN PATENT DOCUMENTS

| | | | | |
|---|---|---|---|---|
| DE | 102012011773 A1 * | 12/2013 | .............. | B60L 53/14 |
| DE | 10 2018 201 672 | 8/2019 | .............. | H04L 9/32 |

OTHER PUBLICATIONS

Office Action for DE Application No. 10 2020 205 022.8, 10 pages, Dec. 7, 2020.

"Data synchronization. In: Wikipedia, the free encyclopedia"; URL: https://en.wikipedia.org/w/index.php?title=Data_synchronization&oldid=951035611, Apr. 15, 2020.

Wikipedia, the free encyclopedia; URL: https://en.wikipedia.org/w/index.php?title=Digital_signature&oldid=951306502, Apr. 16, 2020.

Norm DIN EN ISO 15118-2. Road vehicles—Vehicle-to-grid communication Interface—Part 2: Network and application protocol requirements, https://www.beuth.de/de/norm/din-en-iso-15118-2/250999944, Apr. 1, 2016.

"ISO/IEC 20248. In: Wikipedia, the free encyclopedia."; URL: https://en.wikipedia.org/w/index.php?title=ISO/IEC_20248&oldid=936662977, Jan. 20, 2020.

"Near-field communication. In: Wikipedia, the free encyclopedia"; URL: https://en.wikipedia.org/w/index.php?title=Near-field_communication&oldid=951090562, Apr. 15, 2000.

* cited by examiner

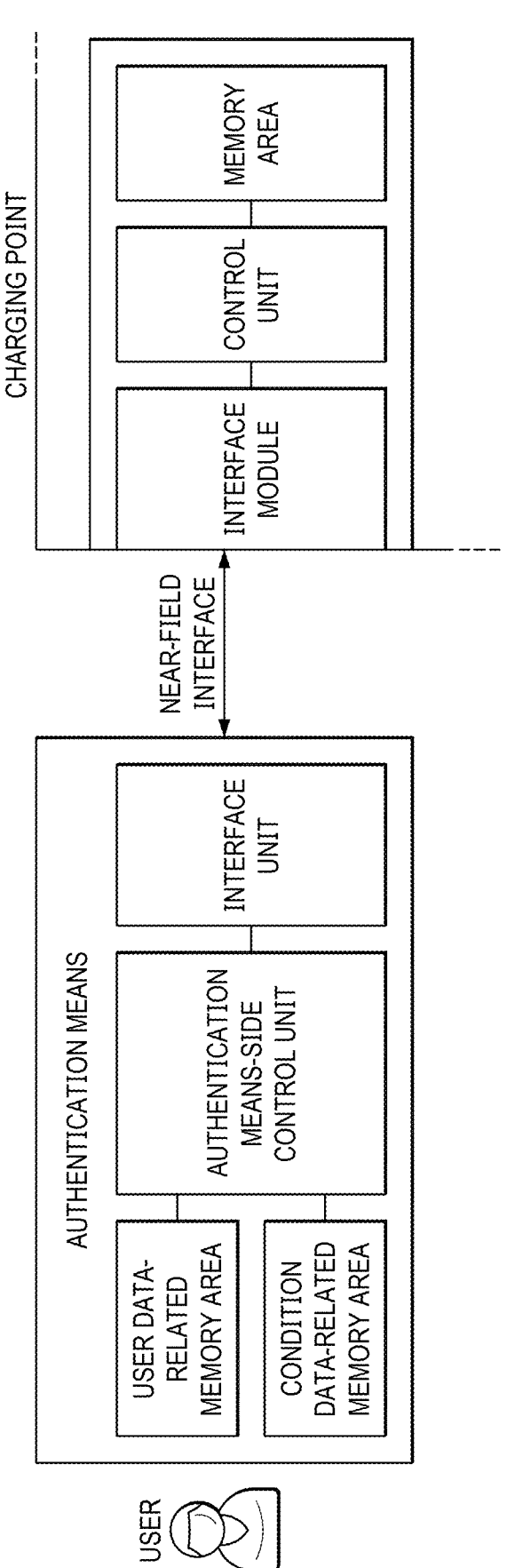

METHOD, AUTHENTICATION MEANS AND AUTHORIZATION DEVICE FOR AUTHORIZING A CHARGING PROCESS

CROSS-REFERENCE TO RELATED APPLICATIONS

This application is a U.S. National Stage Application of International Application No. PCT/EP2021/059894 filed Apr. 16, 2021, which designates the United States of America, and claims priority to DE Application No. 10 2020 205 022.8 filed Apr. 21, 2020, the contents of which are hereby incorporated by reference in their entirety.

TECHNICAL FIELD

The present disclosure relates in general to charging systems. Various embodiments of the teachings herein include methods and/or systems for authorizing electrical charging process at a charging point.

BACKGROUND

Electric vehicles or vehicles driven at least partially using electrical energy have at least one accumulator (e.g., a battery) which is to be charged regularly in running operation of the electric vehicle. Charging of the electric vehicle by a user may be carried out at a charging station or a charging point—also known in the technical world as electric vehicle supply equipment or abbreviated as EVSE— which is connected to the electric vehicle via a charging cable or also using a wireless inductive coupling.

An authentication method which is widespread at such charging points provides a use of an RFID card (radio frequency identification), which is typically also referred to as a charging card. A use of an RFID card as an authentication means has the advantage over other authentication methods that the authentication is also possible offline—thus without data connection between the charging point and a detached central office managing a plurality of users—and can nonetheless be carried out in a cryptographically secured manner.

It has already been routine for some time to distinguish between a charging point operator (CPO) and an electromobility provider (EMP) for managing a charging point. While the electromobility provider traditionally forms a fixed contracting partner for the user, who offers the user access to different charging points and invoices for the charging power obtained there, the charging point operator is responsible for the technical maintenance, the power supply, and the access to the charging infrastructure.

However, a fixed contractual bond to an electromobility provider is increasingly declining. On the one hand, the number of independent charging point operators is increasing. In Germany, for example, approximately 400 municipal electricity suppliers also operate charging points. In addition, there are various companies which operate charging points at their own location and also make them available to the public. On the other hand, the number of electromobility providers is also increasing. A significant fraction of electromobility providers also have companies which enable their employees to charge their vehicles for a fee on parking areas owned by the company.

In particular, progress in digitization has therefore had the result that a contractual relationship between a user and an electromobility provider is increasingly becoming more indirect and in this way indirect contractual relationships formed ad hoc level the path, which is also referred to in the technical world—based on roaming known in mobile communication—as "E-roaming". E-roaming enables a user to charge their electric vehicle at charging points which are not necessarily operated by the electromobility provider itself and in which a previously concluded contractual relationship between the charging point operator and an electromobility provider does not necessarily exist.

E-roaming in electromobility is in particular more extensive in comparison to roaming in mobile communication in that the presently foreseeable contractual relationships are to be made multilateral, on the one hand, and ad hoc, on the other hand. Multilateral contractual relationships arise due to a plurality of charging point operators, whose charging point the user can potentially use. Since in the case of roaming in electromobility, the previously established contractual relationships known from mobile communication usually do not exist with this plurality of charging point operators—or at least do not take into consideration all circumstances of the contractual relationship—terms for service provision between an electromobility provider and the charging point operator are often to be negotiated ad hoc, possibly also with participation of the user.

Reference is made hereinafter to data sets for recording individual or multiple terms, rule sets, and/or conditions for indirect or direct contractual relationships and also condition data sets. A condition data set may be retained in a structured data format, which is optionally expandable and is readable both by human and also machine.

In the case of a charging process and its authorization— thus the decision as to whether the charging process is enabled—therefore three parties—user, charging point operator, electromobility provider—and three contracts— one contract between each two parties—are usually to be taken into consideration. Insofar as no direct connection exists between the electromobility provider or EMP and the charging point operator or CPO, as can occur, for example, in the case of roaming, there are accordingly further parties. In addition, features of the charging infrastructure—e.g., alternating current or AC charging point or direct current or DC charging point, level of the charging power, etc.—and further possible features—time of day, location—are to be taken into consideration, which are capable of influencing the price for the charging energy. For example, it is typical to offer off-peak electricity at a more reasonable price than on-peak electricity. It is also typical to make the level of the price dependent on the location, thus, for example, whether it is located in a remote region or in an urban center.

In a patent application having the application reference number 102019214579.5, the charging point sends condition queries to one or more electromobility providers. From received response messages in response to the condition query, the charging point can check multiple offers of different electromobility providers, also from those electromobility providers with which a contractual relationship with the charging point operator does not yet exist.

Many presently installed charging points—also offline charging points hereinafter—do not have a continuous or even only temporarily accessible data connection, however, so that the above-explained advantages of indirect contractual relationships formed ad hoc do not come into consideration due to the technical restrictions of these offline charging points. Such offline charging points often focus solely on the presence of the RFID card or at most the RFID card in conjunction with a specific issuer, in order to make a decision about a charging release, thus an authorization of the charging process. Such a simple logic prevents the implementation of a variety of rules which form the foundation for an above-explained business model made up of indirect contractual relationships formed ad hoc.

SUMMARY

The teachings of the present disclosure include methods for authorizing a charging process, which offer a technical foundation, even for offline charging points, to offer multiple indirect contractual relationships between a charging point operator and an electromobility provider and to keep this offer appropriately up to date in running operation. As an example, some embodiments of the teachings herein include a method for authorizing a charging process at a charging point comprising: a) establishing a near field interface (IF) between an authentication means (ATD) of a user (USR) and the charging point (CP); b) transmitting a user identification of the user (USR) signed using a signature key via the near field interface (IF) and authenticating the user (USR) by checking the signed user identification on the part of the charging point (CP); c) reconciling a plurality of condition data sets retained in a memory area of the authentication means with a plurality of condition data sets retained in a memory area of the charging point, wherein an item of version information is assigned to at least one of the condition data sets and wherein at least one first condition data set is replaced by a second condition data set by the reconciliation in consideration of a comparison of the respective version information; and d) authorizing the charging process by evaluating at least one condition data set.

In some embodiments, at least one of the plurality of the condition data sets is signed using a condition data set-based signature key.

In some embodiments, a plurality of condition data sets is signed using a condition data set-based signature key.

In some embodiments, the condition data set-based signature key is derived from the signature key of the user (USR).

In some embodiments, the condition data set-based signature keys each differ.

In some embodiments, at least one of the plurality of the condition data sets is encrypted using an encryption key.

In some embodiments, a plurality of condition data sets is encrypted using an encryption key.

As another example, some embodiments include an authentication means for authorizing a charging process of a user at a charging point, the authentication means (ATD) comprising: a user data-related memory area (UDM) for accommodating at least one signature key and a user identification of the user (USR); an interface unit (IR1) for establishing a near field interface (IF) and for transmitting the user identification signed using at least one of the signature keys; a condition data-related memory area (CDM) for accommodating a plurality of authentication means-side condition data sets provided with a respective item of version information, wherein at least one of the authentication means-side condition data sets is assigned an item of version information; and a control unit (CTR1), which is configured, in cooperation with a charging point-side control unit (CTR2), to carry out a reconciliation of at least one of the plurality of authentication means-side condition data sets with at least one of a plurality of charging point-side condition data sets retained in a memory area (MEM) of the charging point (CP), wherein the reconciliation effectuates a replacement of a first condition data set by a second condition data set in consideration of a comparison of the respective item of version information.

In some embodiments, the authentication means is a digital terminal.

As another example, some embodiments include an authorization device for authorizing a charging process at a charging point (CP), comprising: an interface module (IF2) for configuring a near field interface (IF) using an authentication means (ATD) of a user (USR); an authentication module (AUM) for authenticating the user (USR) by checking a signed user identification generated by the authentication means (ATD) and transmitted via the near field interface (IF); a memory area (MEM) for accommodating a plurality of charging point-side condition data sets provided with a respective item of version information, wherein at least one of the charging point-side condition data sets is assigned an item of version information; and a control unit (CTR2), which is configured, in cooperation with an authentication means-side control unit (CTR1), to carry out a reconciliation of at least one of the plurality of charging point-side condition data sets with at least one of a plurality of authentication means-side condition data sets retained in a condition data-related memory area (CDM) of the authentication means (ATD), wherein the reconciliation effectuates a replacement of a first condition data set by a second condition data set in consideration of a comparison of the respective version information.

BRIEF DESCRIPTION OF THE DRAWINGS

Further exemplary embodiments and advantages of the teachings herein are explained in more detail hereinafter on the basis of the drawing. In this case, the single FIGURE shows a schematic illustration of an authorization of a charging process at a charging point.

DETAILED DESCRIPTION

An example method for authorizing a charging process incorporating teachings of the present disclosure comprises: a) establishing a near field interface between an authentication means of a user and the charging point; b) transmitting a user identification of the user signed using a signature key via the near field interface and authenticating the user by checking the signed user identification on the part of the charging point; c) reconciling a plurality of condition data sets retained in a memory area of the authentication means with a plurality of condition data sets retained in a memory area of the charging point, wherein an item of version information is assigned to at least one of the condition data sets and wherein at least one first condition data set is replaced by a second condition data set by the reconciliation in consideration of a comparison of the respective version information; and d) authorizing the charging process by evaluating at least one condition data set.

First step a) provides establishing a near field interface between an authentication means of a user and the charging point. An authentication means is, for example, a wireless value card or a mobile terminal of the user in conjunction with one or more applications running thereon.

In a following step b), an authentication of the user is carried out on the basis of the authentication means. A transmission of a user identification of the user signed using a signature key takes place here via the near field interface at the charging point, where an authentication of the user is carried out by checking the signed user identification.

In a following step c), a reconciliation of a plurality of condition data sets retained in a memory area of the authentication means with a plurality of condition data sets retained in a memory area of the charging point takes place, wherein an item of version information is assigned to at least one of the condition data sets and wherein at least one first condition data set is replaced by a second condition data set by the reconciliation in consideration of a comparison of the respective version information.

In a final step d), an authorization of the charging process takes place by evaluating at least one condition data set. In this evaluation, it is checked on the part of the charging point whether one of the conditions for the charging process stored in the condition data sets, which are provided by an electromobility provider in structured data format, correspond to the expectations of the charging point operator of the charging point provided here. If the evaluation in step d) has the result that the conditions for the charging process transmitted from the electromobility provider correspond to the expectations of a charging point operator, an authorization of the charging process at the charging point finally takes place.

Division points a) to d) are solely for the benefit of a comprehensible reference and are not to be understood on the basis of a fixed chronological sequence. The method steps can be carried out as a whole without consideration of a sequence. In particular, the sequence of method steps c) and d) is arbitrary.

As another example, some embodiments include an authentication means for authorizing a charging process of a user at a charging point. The authentication means may be, for example, in a chip card, key card, smart card, or integrated circuit card (ICC), which is capable of establishing and/or operating an arbitrary air interface, in particular NFC (near field communication), RFID (radio frequency identification), etc. In some embodiments, the authentication means according to the invention is integrated, assigned, and/or embodied in a digital terminal, e.g., a smart phone, smart watch, etc.

As another example, some embodiments include an authorization device for authorizing a charging process at a charging point. The authorization device may be used for installation in a charging point or charging station or a communicative assignment to a charging point or charging station.

The authentication means—also referred to as a charging card if a chip card or RFID card—on the one hand implements the already known function of an authentication of a user of the charging point. In some embodiments, in addition retaining multiple condition data sets is provided in the authentication means. A design of the charging process on the basis of a contractual relationship between an operator of the charging point and multiple electromobility providers is stored in a structured data format in the condition data sets. This measure enables checking multiple condition data sets retained on the authentication means on the part of the offline charging point, before a decision is made about an authorization, i.e., release of the charging process.

The condition data sets contain, for example, conditions offered by a respective electromobility provider for a specific charging process. An example of a condition datum in one of the condition data sets can be a value or a datum which indicates that the user of the authentication means has consented to a load control during the charging process. This consent to a load control gives an operator of the charging point the option of throttling an electric power emitted during the charging process in order to achieve a more reasonable price for the energy to be acquired for the charging on their part. Vice versa, the operator of the charging point or CPO can also only charge a lower price to the electromobility provider or EMP due to the throttled electric power.

In some embodiments, an offline charging point may enter an indirect contractual relationship with an electromobility provider, in that multiple condition data sets stored on the authentication means are checked by a control unit of the offline charging point and then at least one condition data set is selected by the control unit, which determines the control of the charging process on the part of the offline charging point. In some embodiments, using the selection on the part of the charging point of a condition data set stored by one or more electromobility providers, an electromobility provider is also selectable with which the operator of this charging point has not previously maintained a contractual relationship.

In some embodiments, the authentication means is not only used as a data carrier for condition data sets, but is also used as a means for the update of condition data sets at different offline charging points and online charging points, at which the user assigned to the authentication means gradually authenticates themself. In some embodiments, an online charging point has a data connection, which is accessible continuously or also only temporarily, and using which up-to-date condition data sets can be acquired from one or more electromobility providers. In addition to an online charging point, online terminals in general are also conceivable, at which therefore solely an update of the condition data sets stored on the authentication means is possible.

If the authentication means is designed as a digital terminal, this digital terminal can simultaneously embody the authentication means and the online terminal. An online charging point or an online terminal enables an update of the condition data sets stored on the authentication means. In some embodiments, an online charging point or an online terminal is equipped with a function which enables one or more electromobility providers to update the condition data sets.

For this purpose, in some embodiments, an electromobility provider receives access to the authentication means via an online charging point, and/or the charging point operator retrieves up-to-date condition data sets in at least one electromobility provider and then applies them to the authentication means, thus as soon as the user uses the authentication means at one of the charging points assigned to the charging point operator. According to the last-mentioned variant, the condition data sets can in particular be a response of the electromobility provider to a query from an online certificate validation query.

In some embodiments, respective condition data sets at the charging point are replaced by a reconciliation with respectively corresponding condition data sets at the authentication means, or vice versa, so that both the charging point-side condition data sets and also the corresponding authentication means-side condition data sets can each be kept up to date by intended use of different authentication means by different users.

In some embodiments, generally speaking, a memory area of an authentication means is thus used for the purpose of transmitting additional condition data to a service provider, which can be active on the authority of the issuing point of the authentication means, in order to send these items of additional information, thus the condition data, on secure paths and without a further interface.

In some embodiments, at least one of the respective condition data sets is signed with a respective condition data set-based signature key. Signing may protect the condition data sets against infringement of their integrity—thus in particular against forgery or modification. This measure suggests itself, for example, if the condition data sets are organized to such an extent that one condition data set contains multiple or all contract rules of an electromobility provider. In some embodiments, a first condition data set is signed using a first condition data set-based signature key and a second condition data set is signed using a second condition data set-based signature key. This measure may assist integrity protection which is performed by various points or electromobility providers using a separate independent condition data set-based signature key in each case, in which the condition data set-based signature keys thus each differ.

In some embodiments, a plurality of condition data sets is signed using a condition data set-based signature key. This measure suggests itself, for example, if the condition data sets are organized to such an extent that a condition data set only contains several or a few contract rules of an electromobility provider, so that a bundle or a plurality of condition data sets are compiled in a group, which are signed using the condition data set-based signature key.

In some embodiments, the condition data set-based signature key is derived from the signature key of the user.

In some embodiments, the respective condition data sets are additionally encrypted and therefore, in addition to the above-described protection from an infringement of the integrity, a protection against an infringement of the confidentiality is also to be provided.

The FIGURE shows a schematic detail, which is not necessarily to scale, of a charging infrastructure for charging electric vehicles or at least partially electrically driven vehicles. For this purpose, the charging infrastructure comprises a charging point CP, to which the electric vehicle (not shown in the drawing) of a user USR of the charging point CP is connected via a corresponding charging cable (not shown in the drawing) or is also inductively coupled via corresponding devices (not shown in the drawing) for a wireless energy exchange.

The user USR has an authentication means ATD, using which a bidirectional data communication can be established and operated with the charging point CP via a near field interface IF. The authentication means is in the present exemplary embodiment an RFID chip card or mobile terminal of the user USR in conjunction with an application running on the mobile terminal.

An authentication means ATD according to the invention for authorizing the charging process comprises, according to this exemplary embodiment, a user data-related memory area UDM, in which at least one signature key and a user identification of the user USR are stored. Furthermore, an interface unit IR1 is used to establish and operate a near field interface IF and to transmit the user identification signed using at least one of the signature keys.

A condition data-related memory area CDM is used to accommodate a plurality of authentication means-side condition data sets provided with a respective item of version information, wherein at least one of the authentication means-side condition data sets is assigned an item of version information. The condition data-related memory area CDM and the user data-related memory area UDM can alternatively also be combined in a common memory area. Alternatively, the condition data-related memory area CDM can also be added without express definition of a memory area to a previously existing user data-related memory area UDM.

Finally, the authentication means ATD also comprises a control unit CTR1, which is configured, in cooperation with a charging point-side control unit CTR2, to carry out a reconciliation of at least one of the plurality of authentication means-side condition data sets with at least one of a plurality of charging point-side condition data sets retained in a memory area MEM of the charging point CP, wherein the reconciliation effectuates a replacement of a first condition data set by a second condition data set in consideration of a comparison of the respective version information. The cooperation of the authentication means-side control unit CTR1 with the charging point-side control unit CTR2 for reconciliation of the condition data sets can preferably be designed here so that the charging point-side control unit CTR2 carries out essentially all reconciliation operations, while the authentication means-side control unit CTR1 essentially takes over a supply—thus reading and transmitting data to the charging point-side control unit CTR2 and writing data upon instruction of the charging point-side control unit CTR2—on instruction of the charging point-side control unit CTR2. This unequal distribution of the cooperation has the advantage that the charging point-side control unit CTR2 is typically designed having significantly more resources than the authentication means-side control unit CTR1, above all in cases in which the authentication means-side control unit CTR1 operates within an RFID card, which has few resources in any case, as the authentication means ATD.

The condition data sets contain condition data offered by a respective electromobility provider for a specific charging process. These condition data can in particular also include an item of validity information, which restricts the condition data partially or as a whole, in particular with respect to time or location or with respect to the type of the performance or the participants or makes it dependent on terms.

One example for a condition datum in one of the condition data sets can be a value or a datum which indicates that the user of the authentication means has consented to a load control during the charging process. This consent to a load control gives an operator of the charging point the option of throttling electric power emitted during the charging process, in order to in turn achieve a more reasonable price for the energy to be acquired for charging. Vice versa, the charging point operator or CPO can only charge a lower price to the electromobility provider or EMP due to the throttled electric power.

In some embodiments, a condition datum permits a use of the authentication means only on workdays and only in a specific region. Using such authentication means or "charging cards", for example, a use of service vehicles of a nursing service could be restricted to a respective work time and to a usage region. By updating the information, it would also be possible here to update up-to-date service plans by means of reworking the condition data sets.

An authorization device AUT for authorizing the charging process according to this exemplary embodiment is distributed, for example, onto multiple components within the charging point CP and comprises an interface module IF2 for configuring and operating the near field interface IF to the authentication means ATD of the user USR. The authorization device AUT furthermore comprises an authentication module AUM for authenticating the user USR by checking the signed user identification generated by the authentication means ATD and transmitted via the near field interface IF.

A memory area MEM of the authorization device AUT is used to accommodate a plurality of charging point-side condition data sets provided with a respective item of version information, wherein an item of version information is assigned to at least one of the charging point-side condition data sets. Finally, the authorization device AUT comprises a control unit CTR2, which is configured, in cooperation with the authentication means-side control unit CTR1, to carry out a reconciliation of at least one of the plurality of charging point-side condition data sets with at least one of a plurality of authentication means-side condition data sets retained in a condition data-related memory area CDM of the authentication means ATD, wherein the reconciliation effectuates a replacement of a first condition data set by a second condition data set in consideration of a comparison of the respective version information.

The authentication of the user USR takes place with evaluation of the authentication means ATD, on which one or more authentication data are stored. The user identification of the user USR signed using a signature key is transmitted here via the near field interface IF. Additionally or alternatively, a digital certificate (not shown) can also be used to authenticate the user USR. The authentication of the user USR is completed on the part of the charging point by a check of the signed user identification.

Contractual terms or conditions in the condition data sets are stored in a structured data format which is optionally expandable and is readable both by human and also machine. Examples of such a structured data format are markup languages according to:

XML or extensible markup language;

JSON or JavaScript object notation or JSON-LD or JavaScript object notation-linked data; and/or YAML, a recursive acronym for "YAML ain't markup language".

The contracts referenced using the condition data sets can be contracts already closed between the charging point operator of the charging point CP and the electromobility provider, can be offered newly or ad hoc by the electromobility provider, or can also be formed on the basis of model contracts, which are made available by a third party. In particular, a contract can also provide that processing of the payment flows takes place via a third party.

Depending on the result of an evaluation of a condition data set having acceptable conditions, finally an authorization release is granted by the charging point CP, which releases or authorizes electrical charging of the electric vehicle EV by the charging point.

In some embodiments, possible parameters within the condition data set making contracts more specific can describe which additional items of information have to be displayed to the user USR or which feedback—for example their consent to special conditions—are to be obtained on the part of the user USR so that the contract can be applied.

In summary, the teachings of the present disclosure relate to means for authorizing a charging process, which additionally create a technical foundation for an indirect contractual relationship between a charging point operator and one or more electromobility providers. An authentication means, in particular a charging card, is provided here, on which a plurality of condition data sets is stored. Respective charging point-side condition data sets are replaced by a reconciliation by in each case corresponding respective authentication means-side condition data sets or vice versa, so that both the charging point-side and also the respective authentication means-side condition data sets can each be kept up to date by intended use of different authentication means by different users.

A design of the charging process on the foundation of a contractual relationship between an operator of the charging point and multiple electromobility providers is stored in a structured data format in the condition data sets. The design of the charging process is thus decided in a flexible manner before an authorization of the charging process. The possibility is therefore opened up of selecting multiple electromobility providers, also those with which a contractual relationship does not yet exist. The method according to the invention is created so that it can be used without a central instance. The advantage thus results that in the business models of charging point operators, the necessity of a mediator, broker, or a roaming platform and the accompanying costs are dispensed with.

What is claimed is:

1. A method for conducting a charging process at a charging point, the method comprising:

establishing a near field interface between an authentication means of a user and the charging point;

transmitting a user identification of the user signed using a signature key via the near field interface and authenticating the user by checking the signed user identification on the part of the charging point;

reconciling a plurality of condition data sets retained in a memory area of the authentication means with a plurality of condition data sets retained in a memory area of the charging point, wherein an item of version information is assigned to at least one of the condition data sets and wherein a first condition data set is replaced by a second condition data set by the reconciliation in consideration of a comparison of the respective version information;

authorizing the charging process by evaluating at least one of the condition data sets; and charging an accumulator using the charging point only if the process is authorized.

2. The method as claimed in claim 1, wherein at least one of the plurality of the condition data sets is signed using a condition data set-based signature key.

3. The method as claimed in claim 1, wherein a plurality of condition data sets are signed using a condition data set-based signature key.

4. The method as claimed in claim 2, wherein the condition data set-based signature key is derived from the signature key of the user.

5. The method as claimed in claim 2, wherein the condition data set-based signature keys each differ.

6. The method as claimed in claim 1, wherein at least one of the plurality of the condition data sets is encrypted using an encryption key.

7. The method as claimed in claim 1, wherein a plurality of condition data sets is encrypted using an encryption key.

8. A system for charging an accumulator of a user, the system comprising:

a user data-related memory area for accommodating a signature key and a user identification of the user;

an interface unit for establishing a near field interface and for transmitting the user identification signed using the signature key;

a condition data-related memory area for accommodating a plurality of authentication means-side condition data sets provided with a respective item of version information, wherein at least one of the authentication means-side condition data sets is assigned an item of version information;

a control unit configured, in cooperation with a charging point-side control unit, to carry out a reconciliation of at least one of the plurality of authentication means-side condition data sets with at least one of a plurality of charging point-side condition data sets retained in a memory area of the charging point, wherein the reconciliation effectuates a replacement of a first condition data set by a second condition data set in consideration of a comparison of the respective item of version information; and a charging point to supply power to the accumulator only if authorized by the control unit.

9. The authentication means as claimed in claim 8, wherein the authentication means is a digital terminal.

10. A device for charging an accumulator of a user, the device comprising:

an interface module for configuring a near field interface using an authentication means of a user;

an authentication module for authenticating the user by checking a signed user identification generated by the authentication means and transmitted via the near field interface;

a memory area for accommodating a plurality of charging point-side condition data sets provided with a respective item of version information, wherein at least one of the charging point-side condition data sets is assigned an item of version information;

a control unit configured, in cooperation with an authentication means-side control unit, to carry out a reconciliation of at least one of the plurality of charging point-side condition data sets with at least one of a plurality of authentication means-side condition data sets retained in a condition data-related memory area of the authentication means, wherein the reconciliation effectuates a replacement of a first condition data set by a second condition data set in consideration of a comparison of the respective version information; and a charging point to supply power to the accumulator only if authorized by the control unit.

\* \* \* \* \*